(12) United States Patent
Reber

(10) Patent No.: US 9,314,915 B2
(45) Date of Patent: Apr. 19, 2016

(54) BATTERY PACK FOR AN ELECTRIC POWER TOOL

(75) Inventor: Volker Reber, Michelbach an der Bilz (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 673 days.

(21) Appl. No.: 12/709,541

(22) Filed: Feb. 22, 2010

(65) Prior Publication Data

US 2010/0221590 A1 Sep. 2, 2010

(30) Foreign Application Priority Data

Feb. 27, 2009 (DE) .......................... 10 2009 012 180

(51) Int. Cl.
*B25F 5/02* (2006.01)
*A01G 3/053* (2006.01)
*H01M 2/10* (2006.01)

(52) U.S. Cl.
CPC . *B25F 5/02* (2013.01); *A01G 3/053* (2013.01); *H01M 2/1055* (2013.01)

(58) Field of Classification Search
None
See application file for complete search history.

(56) References Cited

U.S. PATENT DOCUMENTS

| 6,004,689 | A | 12/1999 | Walker et al. | |
|---|---|---|---|---|
| 6,326,101 | B1 * | 12/2001 | White et al. | 429/99 |
| 6,455,186 | B1 * | 9/2002 | Moores et al. | 429/71 |
| 6,613,473 | B1 * | 9/2003 | Tong | 429/154 |
| 6,627,345 | B1 * | 9/2003 | Zemlok et al. | 429/99 |
| 7,141,331 | B2 | 11/2006 | Ziegler et al. | |
| 2004/0106036 | A1 | 6/2004 | Geis et al. | |
| 2006/0028183 | A1 | 2/2006 | Izawa et al. | |
| 2008/0152993 | A1 | 6/2008 | Seiler | |
| 2010/0136405 | A1 * | 6/2010 | Johnson et al. | 429/120 |

FOREIGN PATENT DOCUMENTS

| CN | 1296298 | A | 5/2001 |
|---|---|---|---|
| CN | 101330134 | Y | 12/2008 |
| CN | 201174397 | Y | 12/2008 |
| DE | 10056370 | A1 | 7/2001 |
| EP | 0 494 505 | A2 | 7/1992 |
| EP | 1 780 818 | A2 | 5/2007 |
| JP | H06-223804 | A | 8/1994 |
| JP | 2004-152769 | A | 5/2004 |
| JP | 2006-035942 | A | 2/2006 |
| JP | 2008-270122 | A | 11/2008 |
| WO | 2007/100140 | A1 | 9/2007 |

* cited by examiner

*Primary Examiner* — Alix Eggerding
(74) *Attorney, Agent, or Firm* — Gudrun E. Huckett

(57) ABSTRACT

A battery pack for an electric power tool has at least one cell arrangement with a plurality of individual battery cells that are arranged such in a predetermined total number of battery cells upright adjacent to one another for forming a cell container that cell axes of the battery cells are approximately perpendicular to a common reference plane. Cell connectors electrically conductingly connect cell ends of the battery cells. The battery cells of the cell container include a core cell and neighboring cells surrounding the core cell. Points of intersection of the cell axes of all of the neighboring cells with the reference plane are positioned on a closed, approximately elliptical curve. A number of neighboring cells is greater than one third of the total number of the battery cells of cell container.

22 Claims, 9 Drawing Sheets

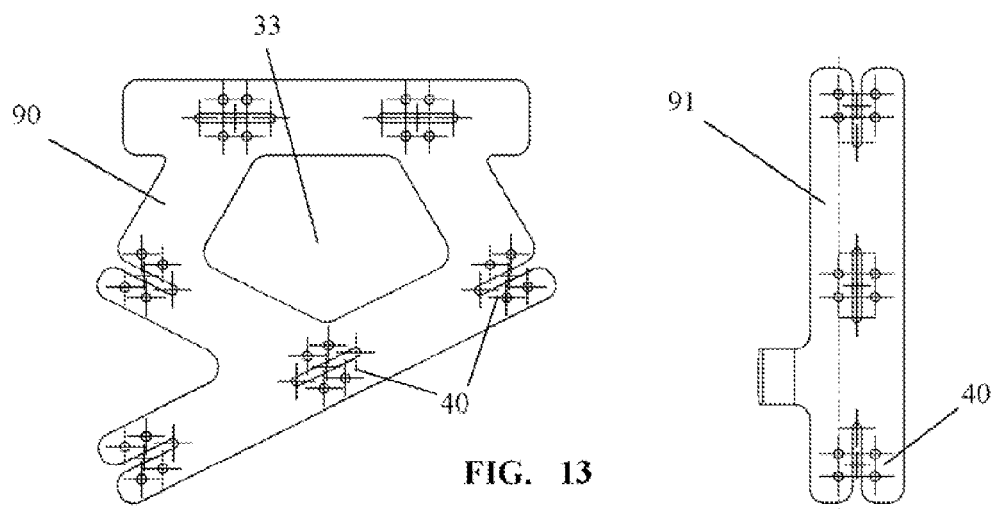
FIG. 13
FIG. 14
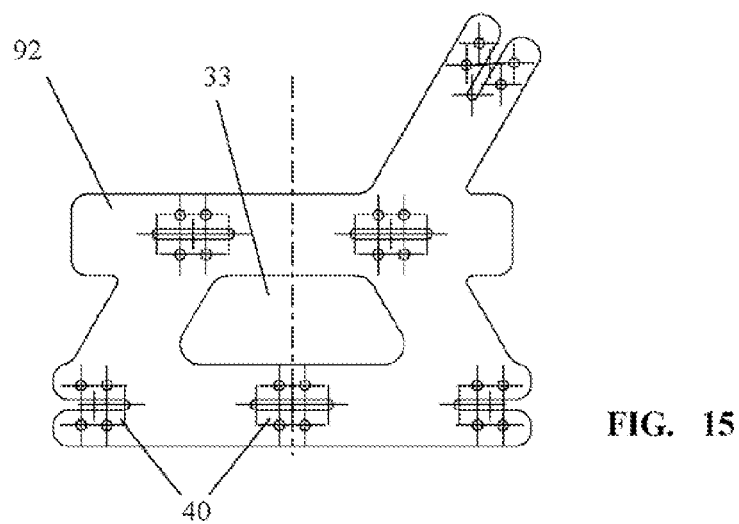
FIG. 15
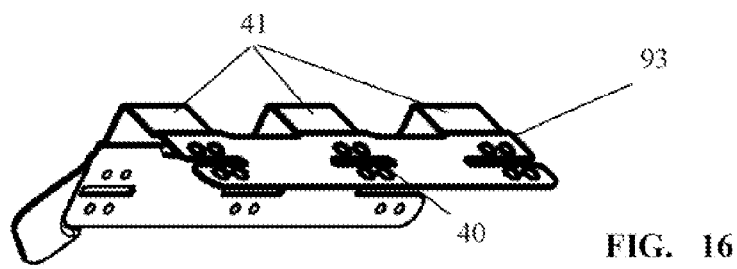
FIG. 16
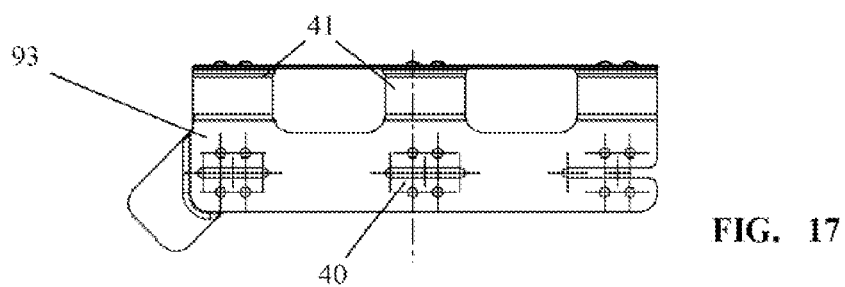
FIG. 17

BATTERY PACK FOR AN ELECTRIC POWER TOOL

BACKGROUND OF THE INVENTION

The invention relates to a battery pack for an electric power tool, in particular for a hand-held power tool such as a motor chain saw, a hedge trimmer or the like, comprised of at least one battery cell arrangement with a plurality of individual battery cells that, for formation of a cell container with a predetermined total number of battery cells, are arranged upright adjacent to one another in such a way that their cell axes are approximately perpendicular to a common reference plane, wherein the battery cells are electrically conductingly contacted with one another at their ends by cell connectors.

Battery pack-operated electric power tools such as cordless screwdrivers or cordless power drills or cordless garden shears are known. They are operated by a battery pack that is secured in the housing of the power tool. On the one hand, the user requires a satisfactory power and adequate operating time; on the other hand, the electric power tool, in particular when hand-held, should not be too heavy.

Battery packs with nickel/cadmium battery cells, nickel metal hydride cells or battery cells on the basis of lithium are known. In particular battery packs on the basis of lithium cells enable a high energy density, and the high voltage that is enabled by them is advantageous.

For operating circular saws, hedge trimmers and the like, battery packs are required that have, on the one hand, a high energy density and, on the other hand, can withstand for an extended operating time the vibrations that occur in operation of the power tool.

SUMMARY OF THE INVENTION

It is an object of the present invention to provide a battery pack of high energy density that is mechanically stable and electrically highly loadable.

In accordance with the present invention, this is achieved in that the battery cell arrangement of a cell container has a core cell that is positioned within a group of neighboring cells, wherein the points of intersection of the battery cell axes of all neighboring cells with the reference plane are positioned on a closed, approximately elliptical curve, wherein the number of neighboring cells is more than one third of the total number of battery cells of the battery cell container.

The cell arrangement of a cell container arranged in the battery pack has a certain geometric configuration that ensures a high electric load capacity. A central core cell is positioned in the way disclosed within a group of neighboring cells whose cell axes are positioned approximately perpendicularly to a common reference plane that may be, for example, a plane parallel to the ends of the battery cells. The term cell container used in the context of the instant specification is to be understood generally as a cell arrangement of the total number of the battery cells that are electrically contacted with one another.

For such a geometric arrangement of the battery cells, between the core cell and the surrounding neighboring cells there is a free space that reduces heat transmission from the neighboring cells onto the core cell. As a result of this, the core cell does not heat up significantly more than the other battery cells arranged in the cell container so that a uniform thermal load is provided that significantly increases the service life and performance of the cell container and of the battery pack that is furnished with such cell containers. Since the performance of a battery pack is determined by the weakest one of the battery cells within the battery pack, and since, according to the present invention, the battery cells are uniformly loaded thermally, the performance difference between the battery cells can be kept low and a significant total output can thus be provided over a longer operating phase.

An advantageous arrangement is provided when the number of neighboring cells is more than half of the total number of the battery cells arranged in a cell container.

The total number of battery cells within a cell container is advantageously approximately nine to 19 battery cells, in particular 15 battery cells. According to a further embodiment of the invention the group of neighboring cells of a core cell of a cell container is comprised of eight battery cells.

It can be expedient when the group of neighboring cells is located between two terminal rows of terminal battery cells wherein the terminal battery cells form of a row of battery cells of preferably three battery cells. In this connection, the position of the battery cells of a cell container can be provided such that the battery cells each, relative to a longitudinal center axis of the cell container, are symmetrically arranged. This simplifies the configuration of a battery pack and its electrical wiring.

In a special embodiment a parallelepipedal cell container has along its narrow sides three terminal battery cells, respectively, as well as a core cell that is centrally arranged relative to the cell holder. The core cell is symmetrically surrounded by four two-cell groups of neighboring cells wherein two such two-cell groups of neighboring cells are positioned along the longitudinal sides of the cell container, respectively. Additionally, two two-cell groups of neighboring cells are positioned between the terminal cells on the narrow sides of the cell container and the core cell, respectively. With this configuration a cell container with 15 battery cells is provided so that with lithium-based battery cells the cell container may provide voltages of up to approximately 65 volts.

In order to ensure a good heat distribution, the center points of the cell ends of the neighboring cells of a two-cell group are positioned on a straight line that is approximately parallel to the longitudinal side or the narrow side of the cell container.

Advantageously, the cell container comprises cell holders that are arranged at the ends of the individual battery cells and that mechanically fix the battery cells in their cell arrangement according to the invention. Each cell end of a battery cell is positioned in a receptacle of the correlated cell holder and the cell end is engaged by the circumferential rim of the receptacle by more than approximately 180°. In this way, transverse forces acting on the battery cells can be safely absorbed. Each battery cell is moreover inserted into the receptacle of the correlated cell holder until the cell end is supported on the bottom of the receptacle so that a substantially play-free support of a battery cell is provided even in the axial direction of the battery cell.

For electrical contacting of the cell ends it is provided that at the bottom of each receptacle a cutout is formed wherein the cutouts at the bottom of neighboring receptacles delimit a common insertion space in which a cell connector that contacts electrically the cells can be inserted. The cell connector extends across the circumferential rim of a receptacle of the cell holder so that the cell holder after securing the cell connector on the cell ends, for example, by welding, are positively mechanically secured between the cell connector and the battery cell.

With this configuration a cell container with a desired cell arrangement is provided in which each cell holder is mechanically secured on the cell ends so that a mechanical unit is provided that imparts to the cell container a high mechanical load capacity.

Preferably, the cell connector is mechanically fixed in the insertion space, preferably is captively secured therein. In this way, a positional orientation of the cell connector and of the cell ends relative to one another before welding is provided. A safe contacting of the cell connector at the ends of the battery cells (plus terminal, minus terminal) before and during the welding process is ensured.

In a simple embodiment, in the cell connector an opening is provided that is engaged by a centering head of the cell holder. By pressing the cell connector into the insertion space the centering head engages the opening so that a safe position-precise securing action of the cell connector in the cell holder is ensured. The cell holder or the insertion space provided therein is therefore utilized as an aligning means for the cell connector in the welding process.

Preferably, on parallel longitudinal sides of the cell holder guide sections are provided with which the cell container can be inserted in a precise positional alignment into a housing of a battery pack.

For obtaining a predetermined positional orientation, the guide section on a first longitudinal side of the cell holder can be displaced relative to the guide section on the second longitudinal side of the cell holder. Preferably, a guide section in plan view onto the end faces of the battery cells is located between two cells.

According to another embodiment of the invention, the longitudinal rim of a guide section can be embodied as a spring tab whose free end terminates approximately in the plane of the longitudinal side of the cell holder. The spring tab can serve for a play-free support of a cell container in the compartment of a battery pack or may also close off a receiving space that serves for housing electrical lines.

The cell holder can have a receiving pocket, for example, for a sensor such as a temperature sensor or can have openings that are provided, for example, for passing through electrical lines.

BRIEF DESCRIPTION OF THE DRAWING

FIG. 13 is a view of a polygonal cell connector for connecting six cell ends.

FIG. 14 is a view of a strip-shaped cell connector for three cell ends.

FIG. 15 is a view of an approximately rectangular cell connector for connecting six cell ends with one another.

FIG. 16 is a perspective view of a cell connector for electrical connection of two cell containers with connecting means for three cell ends each.

FIG. 17 is a side view of the cell connector according to FIG. 16.

DESCRIPTION OF THE PREFERRED EMBODIMENTS

Figure 1:
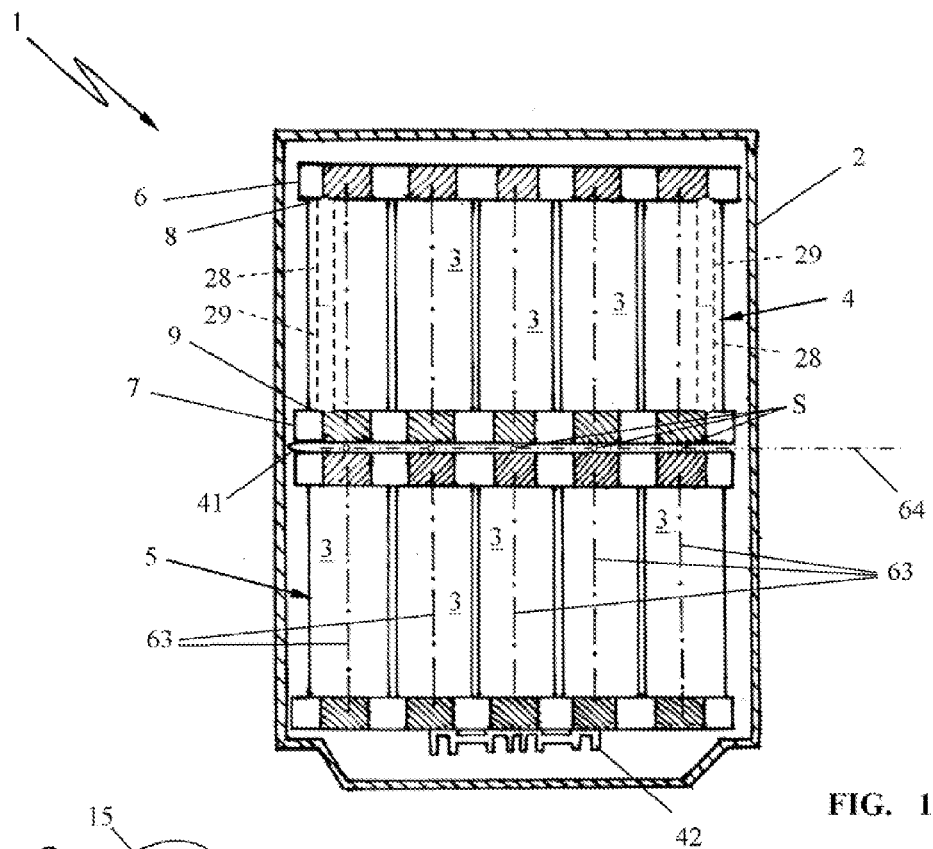
FIG. 1 is a section view of a housing of a battery pack with cell containers arranged therein.

FIG. 1 shows in section a battery pack 1 that is provided as an energy source for a hand-held power tool such as a hedge trimmer, a motor chain saw, a cut-off machine, a grass or brush trimmer, an edger, a pole pruner, a blower, a sprayer, a vacuuming device, an earth auger, a multi-task power tool with multi-functional attachments, a sweeper, a rotary hoe, a rototiller (cultivator), a high-pressure cleaning device, a lawnmower, a dethatcher, a shredder or chopper, a wet/dry vacuuming device, or a similar power tool.

In the housing 2 of the battery pack 1 a plurality of battery cells 3 are arranged. The cells 3 can be rechargeable cells, for example, an NiCd cell (nickel cadmium cell), an NiMH cells (nickel metal hydride cell), a Li-ion cell (lithium ion cell), a LiPo cell (lithium polymer cell), a LiFePO4 cell (lithium iron phosphate cell), a lithium titanate cell or a cell of a similar build. Advantageously, the employed rechargeable battery cell has a cell voltage of 2 volts to 5 volts, preferably 3.6 to 3.7 volts. Depending on the employed connection (serial connection, parallel connection), the battery cells may provide various nominal voltages of the battery pack. With the proposed battery cells 3, battery pack voltages of 12 volts to 150 volts, preferably 25 volts to 50 volts, can be provided, depending on the type of connection (serial connection, parallel connection).

The employed battery cells 3 are arranged in a predetermined geometric basic configuration of a cell arrangement adjacent to one another wherein the individual cells 3 at their cell ends 8, 9 are connected to one another by electric cell connectors in a desired type of electrical connection. The cell container 4, 5 is defined satisfactorily by the geometric basic configuration of the cell arrangement together with the arranged electrical cell connectors. When the cell connectors are embodied mechanically stiff or rigid, a mechanical rigid unit of individual cells is formed after the cell connectors are secured on the end faces of the cell ends 8, 9; such a mechanical rigid unit in the context of the present invention is referred to as a cell container. Such a cell container has preferably a parallelepipedal shape.

The cells 3 have preferably the same geometric shape, for example, a cylindrical basic shape, wherein the cell axes 63 are positioned approximately perpendicularly to a common reference plane 64 which, for example, is determined by the end faces of the ends 8 or 9 of the battery cells 3. The cell axes 63 form with the reference plane 64 points of intersection S. Other geometric basic shapes can be expedient wherein within one cell container battery cells with different basic shapes and/or geometric dimensions may be arranged. Preferably, within one cell container battery cell of the same basic shape, in particular a cylindrical basic shape, are used. The battery cells 3 of a cell container 4, 5 have in particular the same geometric dimensions, i.e., they are identical.

Preferably, the cells 3 of a cell container 4, 5 are secured between an upper cell holder 6 and lower cell holder 7 and together with the cell holders 6, 7 form a stiff mechanically stable assembly of a cell container 4 or 5. In the illustrated embodiment, the battery pack 1 is comprised of two cell containers 4 and 5 wherein the capacity of the battery pack 1 is preferably in a range of 2 Ah to 10 Ah. Also, more than two cell containers 4, 5 can be provided within one battery pack.

The cell holder at one cell end 8 and the cell holder 7 at the opposed cell end 9 of the battery cell 3 are of identical configuration. Therefore, in the following only the cell holder 6 will be described in detail.

Figure 2:
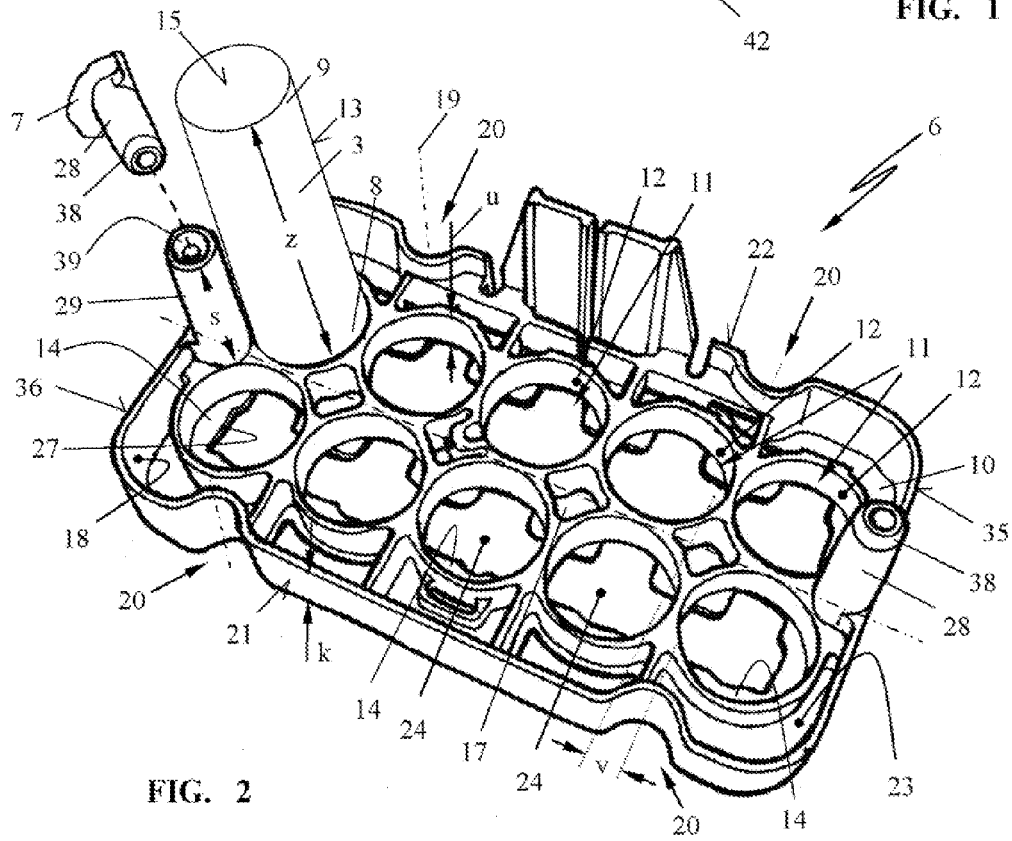
FIG. 2 is a top view of a cell holder.
Figure 3:
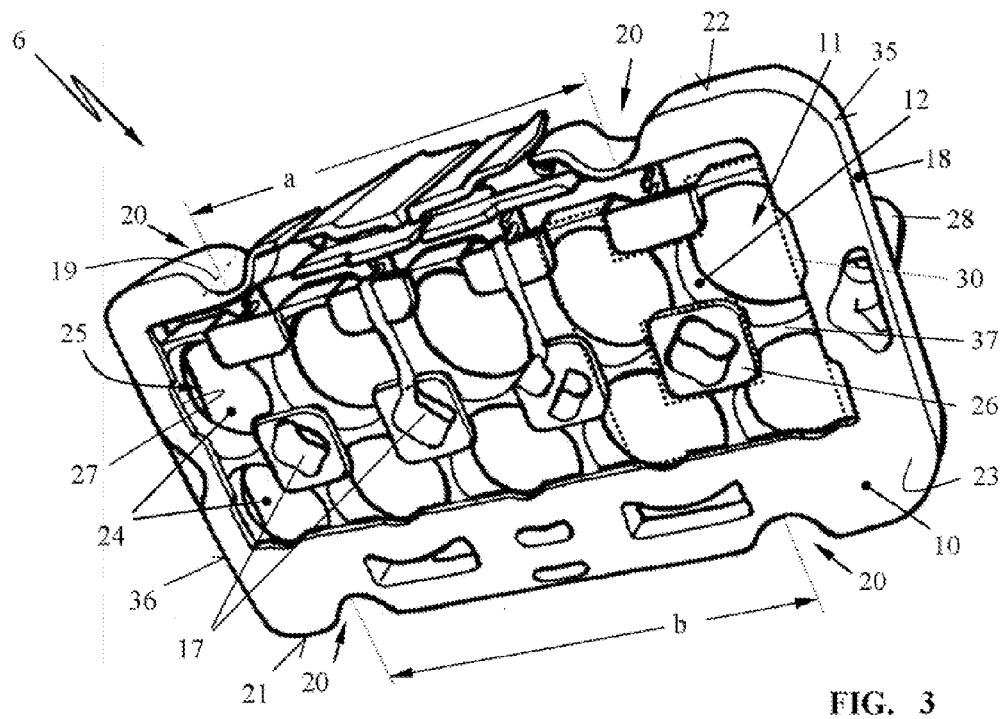
FIG. 3 is a bottom view of a cell holder.
Figure 4:
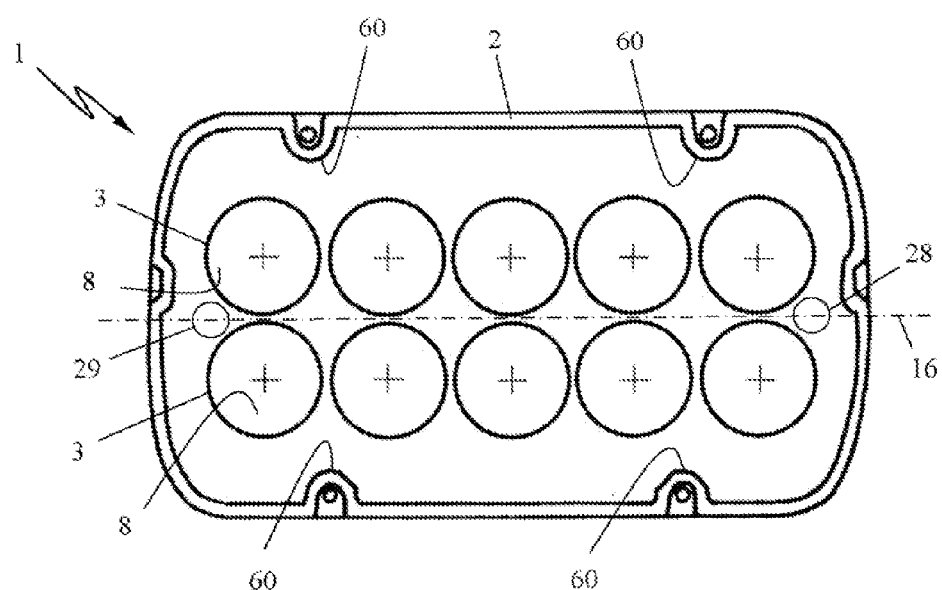
FIG. 4 shows schematically a positional arrangement of battery cells in a battery pack housing.
Figure 5:
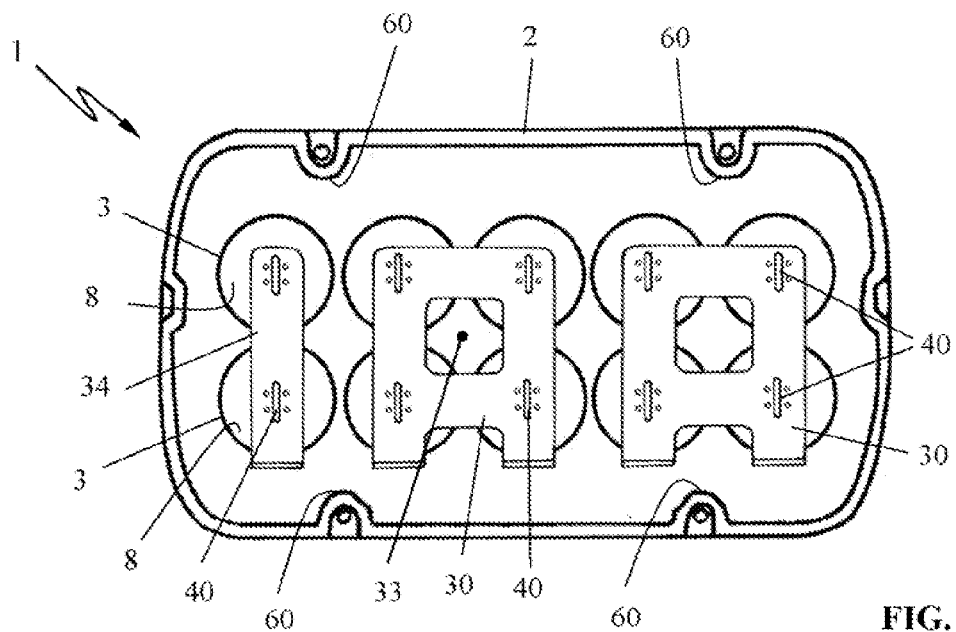
FIG. 5 shows in a schematic illustration the arrangement of cell connectors in a cell arrangement according to FIG. 4.

In FIGS. 2 and 3 a cell holder 6 of a simple configuration is illustrated; it can be used for a cell arrangement of ten cells 3 according to FIGS. 4 and 5 and is completely furnished of filled with battery cells. A partial furnishing of the cell holder with battery cells may be advantageous.

Each cell holder 6 is comprised of a bottom 10 that is provided with receptacles 11. The receptacles 11 are positioned in FIG. 2 in accordance with the desired cell arrangement in the battery pack as shown schematically in FIG. 4. Each receptacle 11 has a circumferential rim 12 of a height u (FIG. 2) that surrounds the cell circumference 13 at the ends 8 and 9, respectively. The circumferential rim 12 surrounds the cell ends 8, 9 preferably about more than a circumferential section of approximately 180°, in the illustrated embodiment according to FIGS. 2 and 3 by 360°.

The cell end 8 inserted into the receptacle 11 is supported on the receptacle bottom 14. The battery cell 3 is thus inserted into the receptacle 11 until it contacts with the end face 15 of its cell end 8, 9 the bottom 14.

In the embodiment according to FIG. 2 two rows of five receptacles 11 each are provided symmetrically to the longitudinal center axis 16 of the cell holder 6 that is also the longitudinal center axis of the cell container or cell arrangement. In the area of the longitudinal center axis 16 between neighboring receptacles 11 in the bottom 10 of the cell holder through openings 17 are arranged. These through openings 17 can serve for passing through electrical lines or the like.

The cell holder 6 has moreover a circumferential collar 18 (FIG. 2) whose height k is advantageously approximately the same as the height u of the circumferential rim 12 of a receptacle 11. The circumferential collar 18, the receptacles 11, and the cell holder 6, 7 are monolithically formed of a non-conducting material, in particular plastic material.

In the substantially closed circumferential collar 18 on parallel longitudinal sides 21, 22 at least one guide section 20 is formed, respectively. The guide section 20 is located inside the approximately rectangular contour of the cell holder 6 and is part cylindrical, in particular a half cylinder. The longitudinal cylinder axis 19 of the cylinder segment is positioned approximately perpendicularly to the plane 23 of the cell holder 6.

As shown in FIG. 2, the guide section 20 provided on the longitudinal side 21 of the cell holder 6 is displaced by a distance v relative to the guide section 20 on the other longitudinal side 22 of the cell holder 6.

It can be expedient to provide two guide sections 20 on each of the longitudinal sides 21, 22 wherein the guide sections 20 on the longitudinal side 21 have a spacing b relative to one another and the guide sections 20 on the longitudinal side 22 have a spacing a relative to one another. Preferably, the spacing a is smaller than the spacing b wherein the arrangement is such that the guide sections 20 of the longitudinal side 22 in a side view are positioned between the guide sections 20 of the longitudinal sides 21. The spacing a is positioned within the spacing b.

As illustrated in FIGS. 2 and 3, at the bottom 14 of the receptacles 11 cutouts 24 are formed wherein, as shown in FIG. 3, neighboring cutouts 24 of several receptacles 11 have a common insertion space 25 for cell connectors 30 by means of which the ends 8 or 9 of the battery cells 3 can be electrically conductingly connected to one another. Such cell connectors 30, 31, 32 for a cell container 4, 5 according to FIGS. 2 and 3 are illustrated in FIGS. 5 to 8.

The cell connector 30 that is illustrated in dotted lines in FIG. 3 has an approximately square configuration and a central opening 33 (see FIG. 6) that is engaged by a centering head 26 of the cell holder 6 (FIG. 3). Preferably, the centering head 26 snaps into the opening 33 of the cell connector 30 so that the cell connector 30 is precisely positioned in the insertion space 25, in particular is mechanically fixedly secured therein. Preferably, the cell connector 30 or 31 inserted into the cell holder 6 is mechanically captively secured in the cell holder 6. Expediently, the edges of the cutouts 24 are provided with an undercut 27 that engages the edge 35 of a cell connector and in this way secures it in the insertion space 25.

Inside the circumferential collar 18 of the cell holder 6 there are two support sleeves 28, 29 that are positioned perpendicularly on the bottom 10 of the cell holder 6. In the embodiment according to FIGS. 2 and 3 the support sleeves 28, 29 are positioned in the area between the battery cells 3 on the narrow sides 35, 36 of the cell holder 6. The height s of such a support sleeve 28, 29 corresponds approximately to half the height z of a cell 3.

The support sleeves 28, 29 are designed differently at their free ends. The support sleeve 29 has a cylindrical receptacle 39 for the end 38 of the support sleeve 28 of the oppositely positioned cell holder 7 (FIG. 2).

As illustrated in FIG. 3, the cell connector 30 bridges the stay 37 between two receptacles 11 that is formed by the circumferential rims 12 of the adjacently positioned receptacles 11.

When ten battery cells are arranged in a cell holder 6 or 7 in accordance with the schematic cell arrangement of FIG. 4, each battery cell 3 is secured at its opposed ends 8 and 9 in one receptacle 11 each. The support sleeves 28 and 29 of oppositely positioned cell holders 6 and 7 engage one another so that the oppositely positioned cell holders 6 and 7 of a cell container 4 or 5 are supported on one another. Preferably, the support sleeves 28 and 29 of the oppositely positioned cell holders 6 and 7 are mechanically connected to one another, in particular are screw-connected to one another as indicated schematically in FIG. 1.

The ten battery cells 3 are combined to an assembly by the interconnected cell holders 6 and 7, i.e., the cell container as defined in the context of the present invention, wherein each cell holder 6, 7 aligns the cell ends 8 and 9 in such a way relative to one another that they can be connected electrically conductingly to one another by the cell connector 30 inserted into the insertion space 25. The cell connectors 30 have weld spots 40 that are fixedly welded onto the ends 8 and 9 of the battery cell 3. In this way, not only an electrical connection that is resistant to high currents is provided but also the mechanical unit of the cell container 4, 5 is further strengthened. Since each cell connector 30 bridges the stay 37 that is comprised of portions of the circumferential rims 12 provided between two receptacles 11, after welding the cell connector 30 onto the ends 8 and 9 of battery cells 3, a positively-locked unit of battery cells, cell holders and cell connectors is provided. The cell container 4, 5 forms a mechanically fixed cell arrangement that even withstands vibrations as they occur in hand-guided portable power tools, for example, motor chain saws, hedge trimmers, cut-off machines and the like.

Figure 8:
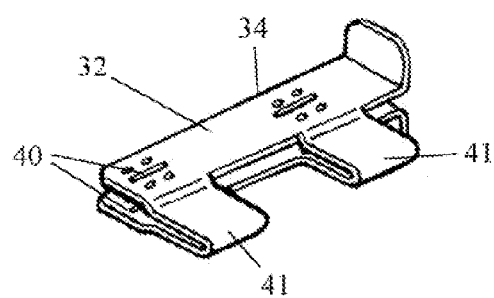
FIG. 8 is a view of a cell connector for connecting two cell containers with one another.

The cell connector 32 illustrated in FIG. 8 is a dual connector and provides the connection between two cell containers 4 and 5 of a battery pack 1 when, as illustrated in FIG. 1 (see reference numeral 41), it is inserted between opposed cell holders 6, 7. The bending area 41 bridges the spacing between the cell containers 4 and 5 stacked on top one another within the battery pack housing 2.

The cell holder 6, 7 is moreover designed such that on its outer flat side a contact strip 42 (FIG. 1) is mechanically secured by means of which the battery pack 1 can be electrically contacted to a consumer. Each cell container 4, 5 is lowered with the aid of the guide sections 20 into the housing 2 of the battery pack 1. In this connection, on the inner side of the housing 2 across its height guide ribs 60 are provided that engage the guide sections 20 provided in the longitudinal sides 21, 22 of the cell holder 6, 7.

As illustrated in FIG. 1, the cell arrangement of a cell container 4, 5 is comprised of a plurality of individual battery cells 3 that are arranged upright adjacent to one another wherein their cell axes 63 are positioned approximately perpendicularly to a common reference plane 64 that, in the illustrated embodiment, is defined by the ends 8 or 9 of the battery cells 3 at their end faces or is positioned parallel thereto. The points of intersection S of the cell axes 63 with the reference plane 64 define in a plan view onto the reference plane 64 a geometric shape, for example, a closed curve.

Such a preferred embodiment of a cell holder 66 is illustrated in FIGS. 9 to 12. The basic configuration of the illustrated cell holder 66 corresponds to that of the afore described embodiment so that for same parts same reference numerals are employed.

Figure 10:
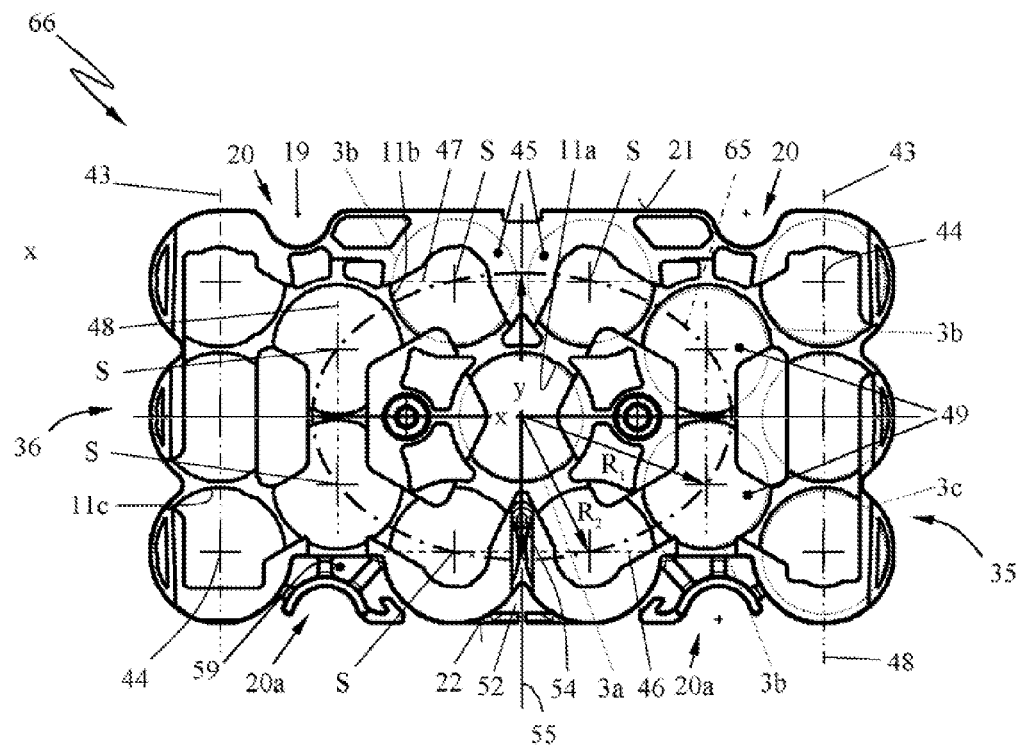
FIG. 10 shows a plan view onto the exterior of the cell holder of FIG. 9.
Figure 11:
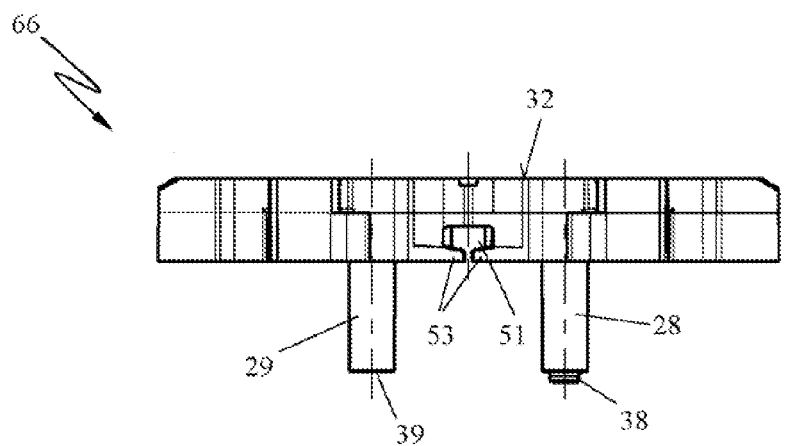
FIG. 11 is a side view of the cell holder according to FIG. 10.
Figure 12:
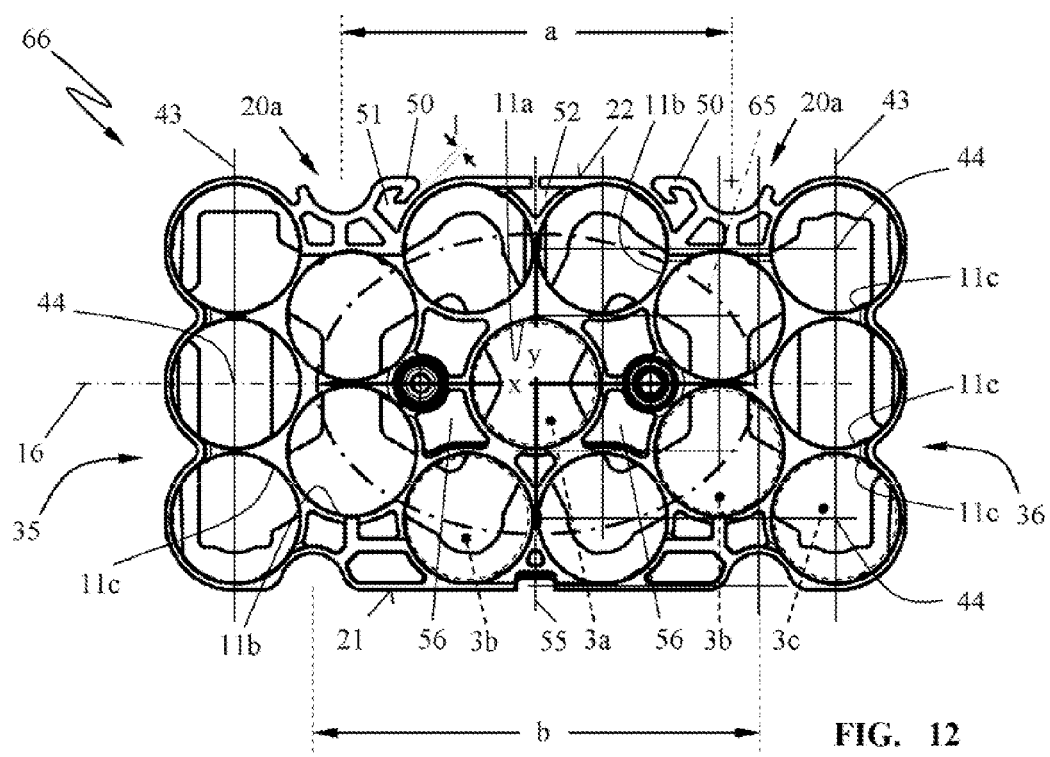
FIG. 12 is a plan view of the interior of the cell holder according to FIG. 10.
Figure 12A:
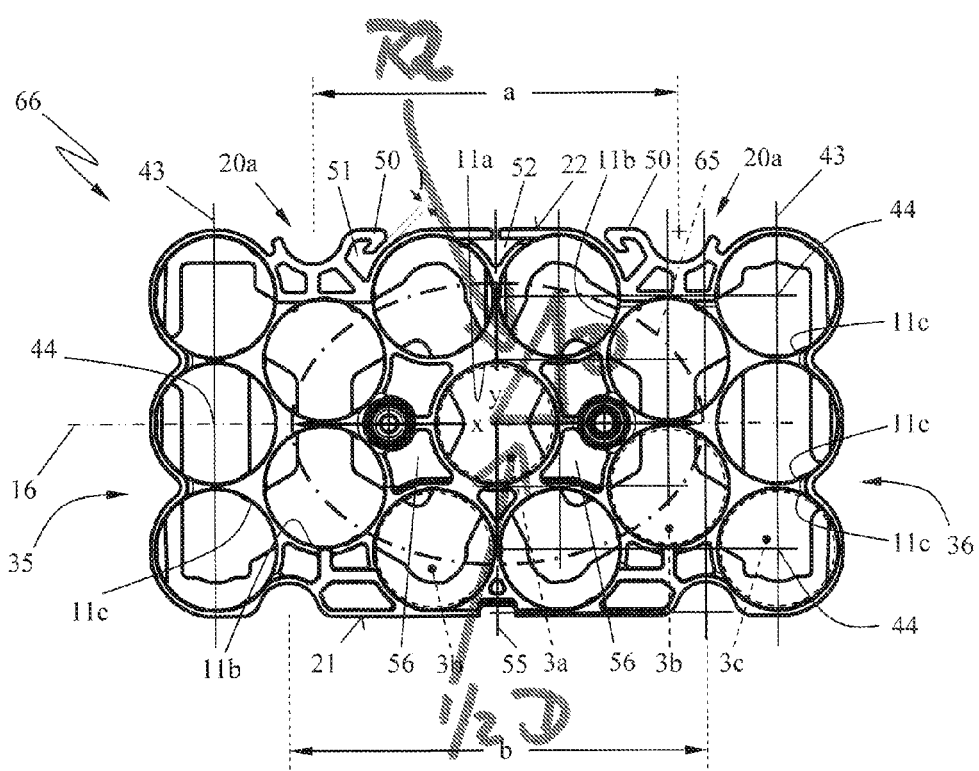
FIG. 12a illustrates the relationship between radial spacing R2 (FIG. 10), measured between the center axes of the core cell and a neighboring cell, and the diameter D of the cells, wherein the radial spacing R2 is the square root of $[(0.5 D)^2 + D^2]$.
Figure 18:
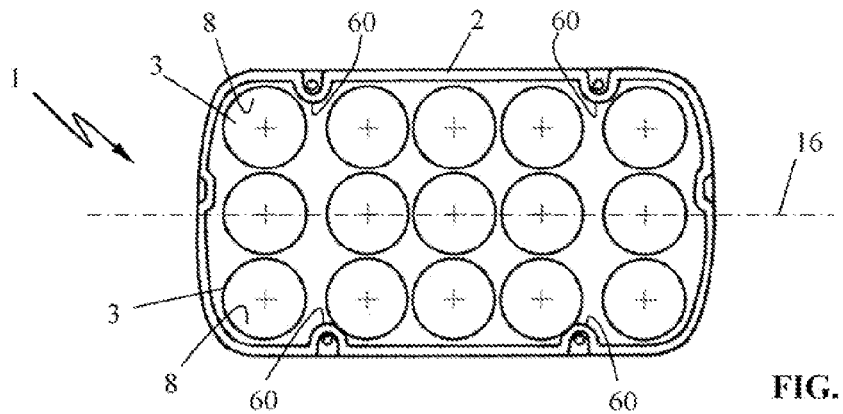
FIG. 18 is a further schematic view of a positional arrangement of battery cells in a battery pack housing.

As can be seen in FIGS. 10 and 12, the cell holder 66 is embodied such that, when fully furnished, a total of 15 battery cells 3 may be contained therein. Along its narrow sides 35, 36 the cell holder 66 has three receptacles 11 for three cells 3c, respectively. The center points 44 of the receptacles 11 are positioned on a common straight line 43 that extends parallel to the narrow side 35 or 36 of the cell holder or cell container.

At the center of the cell holder 66 a centrally arranged receptacle 11a for a core cell 3a is provided. This central receptacle 11a is surrounded by four groups 45, 49 of two receptacles 11b. One group 45 of two receptacles 11b is positioned along parallel longitudinal sides 21, 22 of the cell holder 66 or cell container, respectively, wherein the center points 44 of these receptacles 11b are positioned on a straight line 46, 47 that extends parallel to the longitudinal sides 21, 22.

One additional group 49 of two receptacles 11b is positioned respectively between the central receptacle 11a and the outer receptacles 11c that are located at oppositely positioned parallel narrow sides 35, 36 of the cell holder 66 or the cell container. The center points 44 of the receptacles 11b of the groups 49 are positioned on a straight line 48 that is parallel to the narrow side 35 or 36.

The cell arrangement is such that in the central receptacle 11a of the cell container 66 a core cell 3a is secured that is positioned within a group of neighboring cells 3b secured in the receptacles 11b. As shown in FIGS. 10 and 12, preferably all points of intersection S of the cell axes 63 of the neighboring cells 3b with the reference plane 64 (FIG. 1) are positioned on a common closed curve 65. The curve 65 is in particular an elliptical curve 65 with a minor axis y and a major axis x. The major axis x extends approximately parallel to the longitudinal sides 21 and 22 of the rectangular cell holder 66 while the minor axis y extends approximately parallel to the narrow sides 35 and 36 of the rectangular cell holder 66. The neighboring cells 3b are positioned at different spacings $R_1$ and $R_2$ relative to the central core cell 3a.

The cell holder can be completely or only partially furnished with battery cells depending on the required electrical power and voltage of the cell container. In the illustrated embodiment, the cell holder is completely furnished so that the cell container preferably contains 15 battery cells that form a parallel connection of three rows of cells of five each that are serially connected to one another and provide a cell container voltage of 18 volts. Two serially connected cell containers provide, depending on the charge state, a battery pack voltage of 26 to 42 volts. It may be advantageous to configure a cell holder in such a way that the cell container may hold a total number of cells 3a, 3b, 3c of approximately nine to 19 battery cells, in particular 15 cells 3a, 3b, 3c.

In a preferred cell arrangement the number of neighboring cells 3b is at least more than one third of the total number of cells 3a, 3b, 3c of the cell container. In the illustrated embodiment the number of neighboring cells 3b is more than half of the total number of cells 3a, 3b, 3c of the cell container, i.e., eight battery cells 3b.

The arrangement is such that the groups 45, 49 of neighboring cells 3b are positioned between two terminal rows of terminal cells 3c wherein the terminal cells 3c form two groups of cells 3c aligned along straight line 43, respectively. When the cell holder 66 is completely filled with battery cells, along the narrow sides 35, 36 of the cell holder 66 three terminal cells 3c are provided, respectively. The neighboring cells 3b are positioned in two-cell groups of neighboring cells 3b along the longitudinal sides (21, 22) of the cell holder 66 and between the terminal cells 3c at the narrow sides 35, 36 of the cell holder 66 and the core cell 3a. The center points 44 of the cell ends 8, 9 of the neighboring cells 3b of a two-cell group 45, 49 are positioned on a straight line (46, 47) that extends parallel to the longitudinal sides 21, 22 or the narrow sides 35, 36 of the cell holder 66.

The battery cells 3 of a cell container 4, 5 relative to a longitudinal axis 16 of the cell container or the cell holder 66 are symmetrically arranged wherein this symmetrical arrangement is provided relative to the minor axis y of the curve 65 as well as to the major axis x. The cell holder 66 itself has relative to the transverse axis 55, without taking into consideration the support sleeves, a corresponding symmetry but relative to the longitudinal center axis 16 is asymmetrical.

Figure 9:
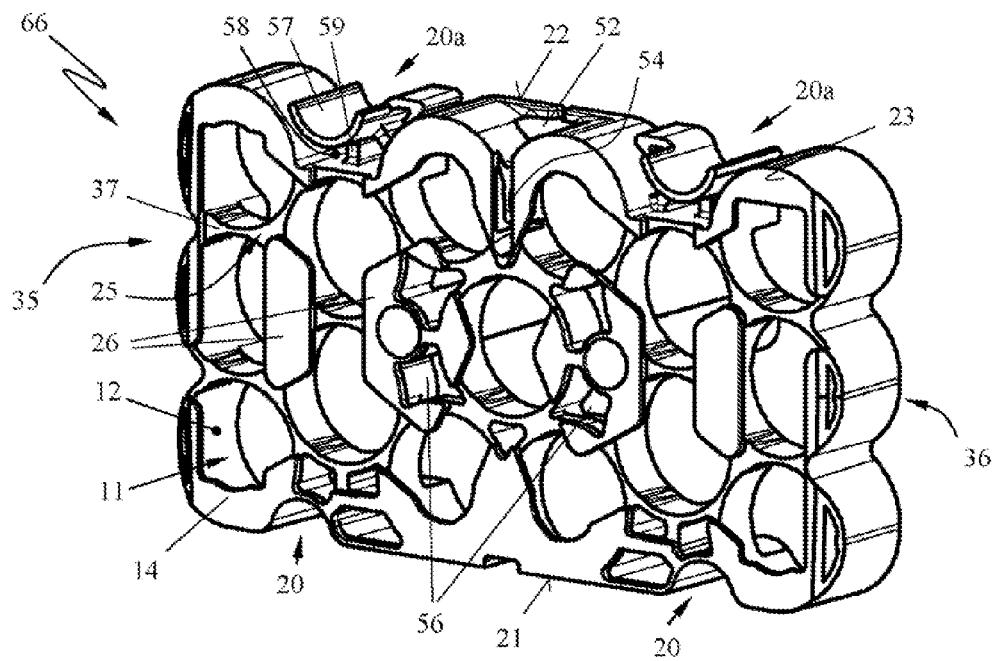
FIG. 9 is a perspective view of a further cell holder for a further cell arrangement.

As can be seen in particular in FIGS. 9, 10, and 12, the guide sections 20a of the longitudinal side 22 has longitudinal edges that are designed as spring tabs 50. The spring tabs 50 delimits a receiving space 51 that is substantially closed off relative to the longitudinal side 22 by the tab 50. The longitudinal edge of the tab 50 has relative to the base body of the cell holder 66 a spacing I through which the lines used for wiring can be clipped into the receiving space 51.

The embodied guide section 20a is formed by a cylindrical half shell 57 that is secured by means of one or several stays 58 on the cell holder 66. The cylinder longitudinal axis of the guide section 20a is positioned approximately perpendicularly to the plane of the cell holder 66. The stays 58 have a shorter longitudinal extension than the half shell 57 so that between the half shell 57 and the circumferential rim 12 of the cell holder 66 a guide passage 59 is formed which may be used for positioning electrical wires.

Between the receptacles 11b of the two-cell group 45 arranged along the longitudinal side 22, a further receiving space 52 is formed adjacent to the longitudinal side 22 that is closed off by elastic tongues 53. Moreover, a receiving pocket 54 for a sensor, for example, a temperature sensor, is provided in order to monitor the state of the battery cells 3 in the cell container 4, 5. The receiving space 54 is positioned between two cells, in particular between two neighboring cells 3b and rests against both cells in a heat-transmitting way; optionally, a thermally conductive paste is provided for this purpose.

In the embodiment according to FIGS. 9 to 12, the support sleeves 28, 29 are positioned between the cells 3a and 3b of the cell container wherein according to FIG. 12 the support sleeves are located adjacent to the central receptacle 11a. The support sleeves 28 and 29 are positioned on the longitudinal center axis 16 of the cell holder 66.

As shown in FIGS. 9, 10, and 12, between the central receptacle 11a and the neighboring receptacle 11b at the bottom 10 of the cell holder at least one opening 56 is formed. In the embodiment, symmetric to the longitudinal center axis 16 and to the transverse axis 55, several openings 56 are provided that serve for passing electrical wires therethrough.

Moreover, the flat side of the cell holder 66 that is facing away from the cell ends has centering heads 26 (FIG. 9) that engage matching openings 33 in the cell connectors 90, 92 that are positioned precisely in the insertion space 25. Such cell connectors are illustrated in FIGS. 13 and 15.

Figure 6:
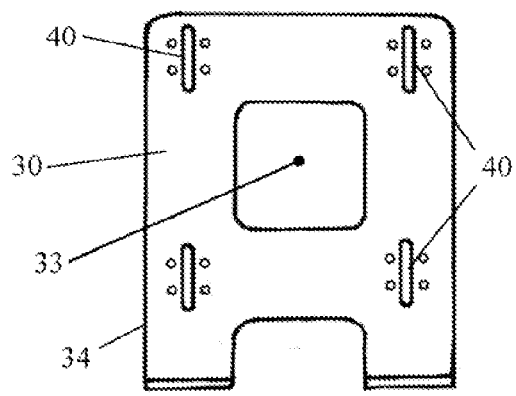
FIG. 6 is a view of an approximately square cell connector.
Figure 7:
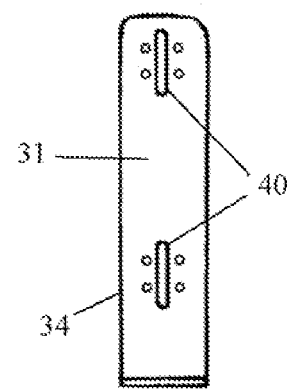
FIG. 7 is view of a tab-shaped cell connector.

For electrical contacting of the cells of a cell holder 66 the cell connectors 90, 91, 92, 93 according to FIGS. 13 to 17 are used which in their basic configuration correspond to those of FIGS. 6 to 8. Same parts are identified with same reference numerals.

The cell connectors 90 and 92 have openings 33 for engagement of the centering heads 26 and are designed for connecting six battery cells at the same time. The cell connectors 91 and 93 (FIGS. 14 and 16, 17) serve for electrically connecting three cell ends of a cell holder. The cell connector 93 is a dual connector and serves for connecting a first cell container with a second cell container in common battery pack housing, as illustrated schematically in FIG. 1.

Figure 19:
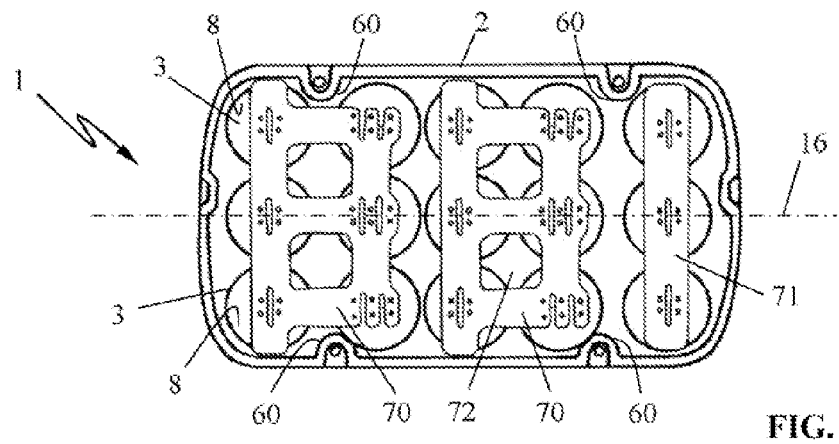
FIG. 19 shows a schematic arrangement of the cell connectors in a cell arrangement according to FIG. 18.
Figure 20:
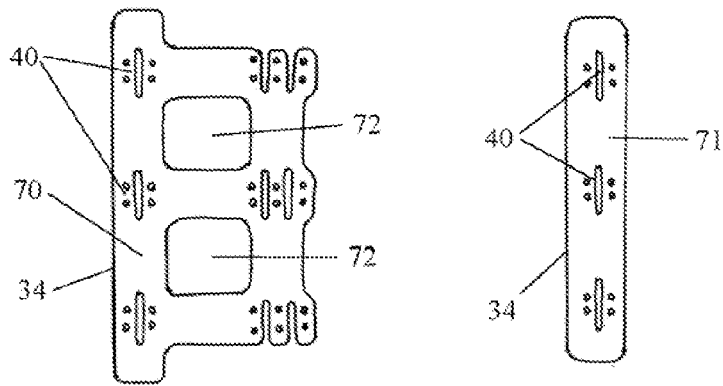
FIG. 20 is a view of a rectangular cell connector with central openings.
Figure 21:
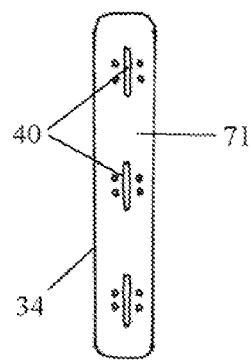
FIG. 21 is a view of a tab-shaped cell connector.
Figure 22:
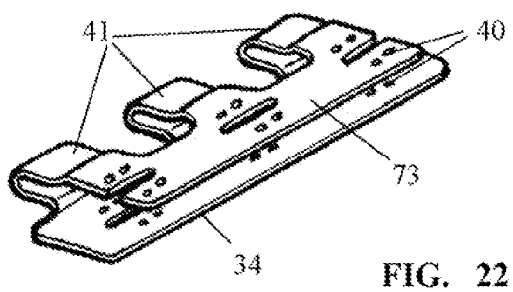
FIG. 22 is a view of a cell connector for electrical connection of two cell containers.

In the embodiment according to FIGS. 18 to 22 a further possible cell arrangement (FIG. 18) is illustrated that can also be constructed of the cell holders according to the invention. As shown in FIG. 19, 15 battery cells are arranged and connected to one another such that they can be inserted into the housing 2 of battery pack 1 in accordance with the illustration of FIG. 1. With appropriately designed cell connectors 70 (FIG. 20) six battery cells 3 each can be connected to one another at their cell end 8 wherein the last three cells of the cell assembly are to be connected to one another by a tab-shaped cell connector 71 (FIG. 21). The cell connector 70 can have several openings 72 for engagement of centering heads. The cell connector 73 (FIG. 22) is utilized for connection of two cell containers 4, 5 as exemplified by the cell connectors 32 of FIG. 1.

Figure 23:
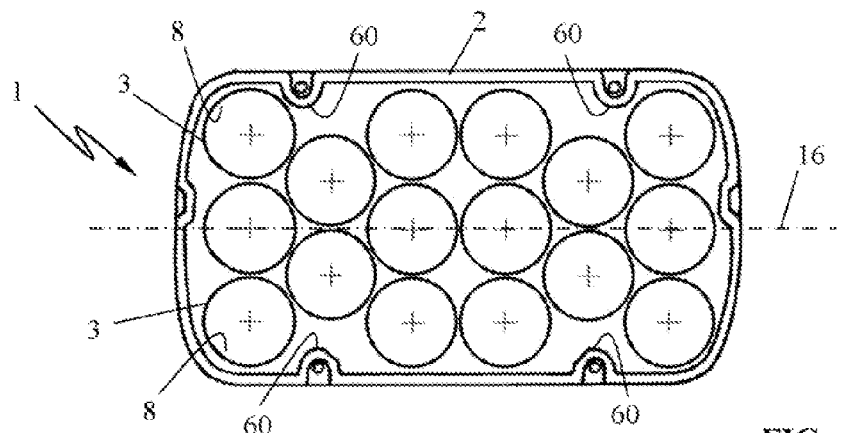
FIG. 23 shows schematically a further cell arrangement in a battery pack housing.
Figure 24:
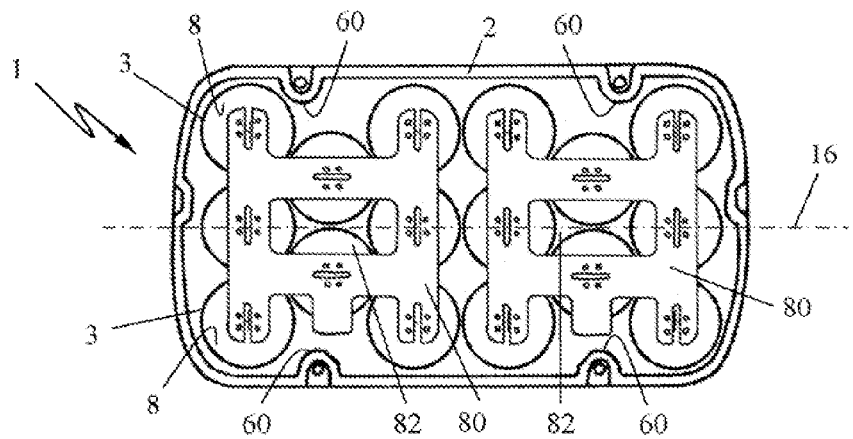
FIG. 24 is a schematic illustration of the cell connectors for a positional arrangement according to FIG. 23.
Figure 25:
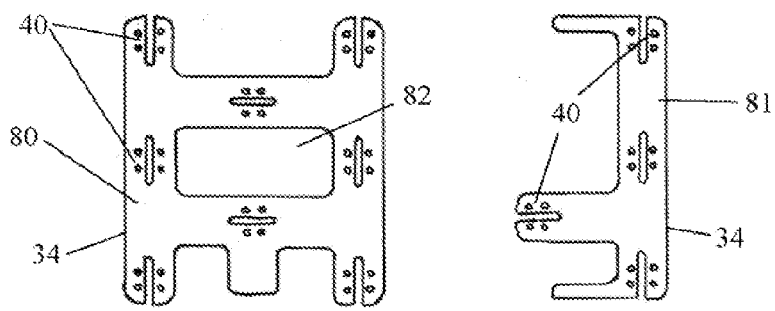
FIG. 25 is a detail view of a cell connector for eight battery cells.
Figure 26:
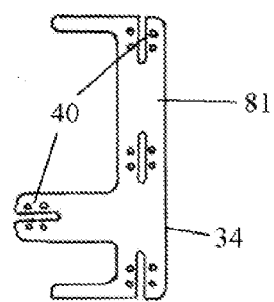
FIG. 26 is a detail view of a cell connector for four battery cells.
Figure 27:
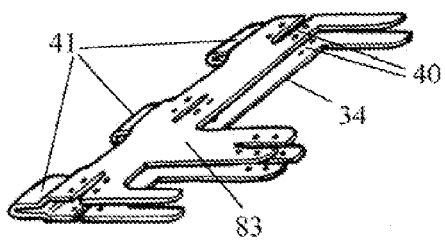
FIG. 27 is a perspective view of a cell connector for electrically connecting two cell containers.

In the embodiment according to FIGS. 23 to 27, a schematic cell arrangement of 16 cells is illustrated. The cell arrangement of individual battery cells 3 in FIG. 23 is realized in groups of eight cells each in a 3-2-3 configuration wherein between two rows of three battery cells only two battery cells are positioned. The battery cells 3, as shown in FIG. 24, are connected with one another by cell connector 80 (FIG. 25) provided with an opening 82 in groups of eight battery cells 3. On the opposite side of the cell container, with corresponding contacting, appropriately designed cell connectors 81 (FIG. 26) are used that contact four cells with one another.

The cell connector 83 (FIG. 27) serves for electrically connecting stacked cell containers 4, 5, as illustrated in FIG. 1, as exemplified by cell connector 32 (shown in FIG. 8 in detail). In a battery pack 1 one cell connector can be used alone but also several cell connectors, also more than two, can be connected with one another.

In a special embodiment of the invention the cell holders of a cell container are identical parts. In this connection, the cell holders can be supported relative to one another by means of the support sleeves wherein the support sleeves are in particular mechanically connected to one another, expediently are screw-connected to one another. In this way, already before insertion and welding of the cell connectors a mechanically stable structure of cell holders and battery cells of the cell arrangement is provided so that in the course of the manufacturing process an assembly is provided that can be easily processed further.

The specification incorporates by reference the entire disclosure of German priority document 10 2009 012 180.3 having a filing date of Feb. 27, 2009.

While specific embodiments of the invention have been shown and described in detail to illustrate the inventive principles, it will be understood that the invention may be embodied otherwise without departing from such principles.

What is claimed is:

1. A battery pack for an electric power tool, the battery pack comprising:

at least one cell arrangement with a plurality of individual battery cells;

an upper cell holder and a lower cell holder, wherein said battery cells are secured between the upper cell holder and the lower cell holder and wherein said battery cells, the upper cell holder and the lower cell holder together form a parallelepipedal cell container;

the upper and lower cell holders each having a first longitudinal side, a second longitudinal side, and narrow sides;

wherein a predetermined total number of said battery cells is arranged upright adjacent to one another for forming the cell container such that cell axes of said battery cells are approximately perpendicular to a common reference plane;

cell connectors electrically conductingly connecting cell ends of said battery cells;

wherein said battery cells of said cell container comprise a core cell and neighboring cells surrounding said core cell, wherein said neighboring cells each are radially spaced from said core cell so that said core cell and said neighboring cells do not contact each other, respectively, and an enlarged free radial space is provided around said core cell compared to an arrangement in which said neighboring cells are contacting said core cell;

wherein said neighboring cells are radially spaced at different radial spacings relative to said core cell, respectively, so that points of intersection of said cell axes of all of said neighboring cells with said reference plane are positioned on a closed elliptical curve having a major axis and a minor axis, wherein the major axis is greater than the minor axis, wherein said core cell is positioned at a point of intersection of the minor axis and the major axis and wherein none of said neighboring cells is aligned with said core cell on the minor axis or the major axis;

wherein said enlarged free radial space reduces a heat transmission from said neighboring cells surrounding said core cell onto said core cell, respectively;

wherein the major axis extends approximately parallel to the first and second longitudinal sides of the cell holders and the minor axis extends approximately parallel to the narrow sides of the cell holders;

wherein a number of said neighboring cells is greater than one third of said total number of said battery cells of said cell container;

wherein said battery cells of said cell container comprise terminal cells that are arranged in two terminal rows opposite each other, wherein said neighboring cells are positioned between said two terminal rows of said terminal cells;

wherein center points of said terminal cells in each of said two terminal rows are positioned on a straight line, respectively, wherein said straight line extends perpendicular to said major axis, respectively;

wherein said core cell, said neighboring cells, and said terminal cells each have the same geometric shape and the same geometric dimensions.

2. The battery pack according to claim 1, wherein said number of said neighboring cells is greater than half of said total number of said battery cells.

3. The battery pack according to claim 1, wherein said total number of said battery cells is approximately nine to 19.

4. The battery pack according to claim 1, wherein said total number of said battery cells is 15.

5. The battery pack according to claim 1, wherein said number of said neighboring cells is eight.

6. The battery pack according to claim 1, wherein said terminal rows each comprise three of said terminal cells.

7. The battery pack according to claim 6, wherein said cell container has narrow sides and along said narrow sides said terminal rows are located, respectively, wherein said core cell is substantially centrally arranged within said cell container, wherein said neighboring cells are arranged in four two-cell groups about said core cell, wherein two of said two-cell groups are positioned on longitudinal sides of said cell container, respectively, and two of said two-cell groups are positioned between said terminal rows and said core cell, respectively.

8. The battery pack according to claim 7, wherein center points of said cell ends of said neighboring cells of said two-cell group are positioned on a straight line, respectively, wherein said straight line extends parallel to said longitudinal sides or said narrow side of said cell container, respectively.

9. The battery pack according to claim 1, wherein the upper and lower cell holders are provided with receptacles, wherein said cell ends each are positioned in one of said receptacles of the upper and lower cell holders, wherein said receptacles each have a circumferential rim that surrounds said cell end received in said receptacle by more than approximately 180°, wherein said cell ends are supported on a bottom of said receptacles, and wherein said bottom of said receptacles has a cutout, wherein said cutouts of adjacently positioned one of said receptacles define an insertion space for one of said cell connectors that extends across said circumferential rim of said receptacles and that is secured to said cell ends in said adjacently positioned ones of said receptacles, wherein the upper and lower cell holders, after securing said cell connector to said cell ends, are positively mechanically secured between said cell connector and said battery cells.

10. The battery pack according to claim 9, wherein said cell connector is mechanically secured in said insertion space.

11. The battery pack according to claim 10, wherein said cell connector is captively secured in said insertion space.

12. The battery pack according to claim 9, wherein the upper and lower cell holders each have a centering head and said cell connector has an opening that is engaged by the centering head of said cell holder.

13. The battery pack according to claim 9, wherein said cell connector is secured precisely between edges of said insertion space.

14. The battery pack according to claim 9, wherein said first and second longitudinal sides of the upper and lower cell holders are parallel to each other and are each provided with a guide section, wherein said guide section of said first longitudinal side is displaced by a spacing in the longitudinal direction relative to said guide section of said second longitudinal side, respectively.

15. The battery pack according to claim 14, wherein said guide sections are located between two of said battery cells in a plan view onto said cell ends.

16. The battery pack according to claim 14, wherein said guide sections each have an edge provided with a springy tab having a free end that is positioned approximately within a plane of said first and second longitudinal sides, respectively.

17. The battery pack according to claim 9, wherein said cell holders have a receiving pocket in which a sensor is arranged.

18. The battery pack according to claim 17, wherein said sensor is a temperature sensor.

19. The battery pack according to claim 1, wherein one of said cell connectors is a dual connector that provides an electrical connection between two said cell containers.

20. The battery pack according to claim 19, wherein said dual connector connects said cell ends of said battery cells of a first one of said two cell containers with said cell ends of said battery cells of a second one of said two cell containers.

21. The battery pack according to claim 1, wherein said battery cells of said cell container are arranged symmetrically relative to a longitudinal center axis of said cell container.

22. A battery pack for an electric power tool, the battery pack comprising:
at least one cell arrangement with a plurality of individual battery cells;
an upper cell holder and a lower cell holder, wherein said battery cells are secured between the upper cell holder and the lower cell holder and wherein said battery cells, the upper cell holder and the lower cell holder together form a parallelepipedal cell container;
the upper and lower cell holders each having a first longitudinal side, a second longitudinal side, and narrow sides;
wherein a predetermined total number of said battery cells is arranged upright adjacent to one another for forming the cell container such that cell axes of said battery cells are approximately perpendicular to a common reference plane;
cell connectors electrically conductingly connecting cell ends of said battery cells;
wherein said battery cells of said cell container each have the same geometric shape and the same geometric dimensions;
wherein said battery cells comprise a core cell and neighboring cells surrounding said core cell, wherein said neighboring cells are radially spaced from said core cell by a radial spacing measured between said cell axis of said core cell and said cell axis of said neighboring cells, respectively;

wherein points of intersection of said cell axes of all of said neighboring cells with said reference plane are positioned on a closed elliptical curve having a major axis and a minor axis, wherein the major axis is greater than the minor axis;

wherein said radial spacing amounts to at least a value of the square root of $[(0.5\ D)^2+D^2]$ and provides a free radial space between said core cell and said neighboring cells, respectively, wherein D is the diameter of said core cell and of said neighboring cells, respectively;

wherein said free radial space reduces a heat transmission from said neighboring cells surrounding said core cell onto said core cell, respectively;

wherein the major axis extends approximately parallel to the first and second longitudinal sides of the cell holders and the minor axis extends approximately parallel to the narrow sides of the cell holders;

wherein a number of said neighboring cells is greater than one third of said total number of said battery cells of said cell container;

wherein said battery cells of said cell container comprise terminal cells that are arranged in two terminal rows opposite each other, wherein said neighboring cells are positioned between said two terminal rows of said terminal cells.

* * * * *